United States Patent [19]

Grikis

[11] Patent Number: 4,461,380
[45] Date of Patent: Jul. 24, 1984

[54] FASTENER FEEDER

[75] Inventor: Raimonds Grikis, Morton Grove, Ill.

[73] Assignee: Duo-Fast Corporation, Franklin Park, Ill.

[21] Appl. No.: 309,704

[22] Filed: Oct. 8, 1981

[51] Int. Cl.³ .................................................. B65G 47/24
[52] U.S. Cl. ...................................... 198/389; 198/397
[58] Field of Search ........................ 198/389, 397, 786; 221/160, 165; 474/252

[56] References Cited

U.S. PATENT DOCUMENTS

| | | | |
|---|---|---|---|
| 1,191,938 | 7/1916 | Bazzoni | 221/160 |
| 2,879,919 | 3/1959 | Knoche | 198/786 |
| 3,017,184 | 1/1962 | Gruss | 198/397 |
| 3,229,804 | 1/1966 | Anderson | 198/389 |
| 3,337,089 | 8/1967 | Bronfman | 221/160 |
| 3,349,891 | 10/1967 | Burgess | 221/160 |
| 3,552,539 | 1/1971 | Rutter | 198/389 |
| 3,675,302 | 7/1972 | Dixon | 198/397 |
| 3,774,806 | 11/1973 | Swart et al. | 198/397 |
| 3,779,422 | 12/1973 | Mori et al. | 221/160 |
| 3,815,730 | 6/1974 | Zwiep et al. | 198/389 |
| 4,174,028 | 11/1979 | Barnes | 198/389 |
| 4,274,531 | 6/1981 | Whitmore | 198/397 |
| 4,330,287 | 5/1982 | Fischer | 474/252 |

Primary Examiner—Robert J. Spar
Assistant Examiner—Jonathan D. Holmes
Attorney, Agent, or Firm—Mason, Kolehmainen, Rathburn & Wyss

[57] ABSTRACT

A feeder for fastener is used to supply uniformly oriented, uncollated fasteners to a detachably mounted loading assembly so that the uncollated fasteners can be loaded into a magazine of the fastener driving tool. The feeder includes a rotatable supply drum mounted on a base into which fasteners may be supplied. Scoops along the inner wall of the drum scoop up a quantity of fasteners as the drum is rotated and supplies the fasteners to an orientation assembly. The orientation assembly receives the unoriented fasteners on a funnel-shaped trough which directs the fasteners toward a rotatable orientation roller disposed on one side of a fastener path. The orientation roller has several notches or grooves that tend to jiggle or agitate the fasteners so that the fasteners are oriented in the fastener path with the heads of the fasteners lying on an orientation rail on the opposite side of the fastener path from the orientation roller. The fasteners travel along the fastener path toward the loading assembly which has a loading path in alignment with the fastener path. The drum and orientation roller are rotated by a single motor through a belt drive system having a plurality of pulleys such that the orientation roller can be rotated at a greater speed than the supply drum. Once the fasteners are supplied to the loading assembly a photo-optical control is used to detect when the loading path is full of fasteners so that the motor can be turned off when no further fasteners need be supplied to the loading assembly.

44 Claims, 25 Drawing Figures

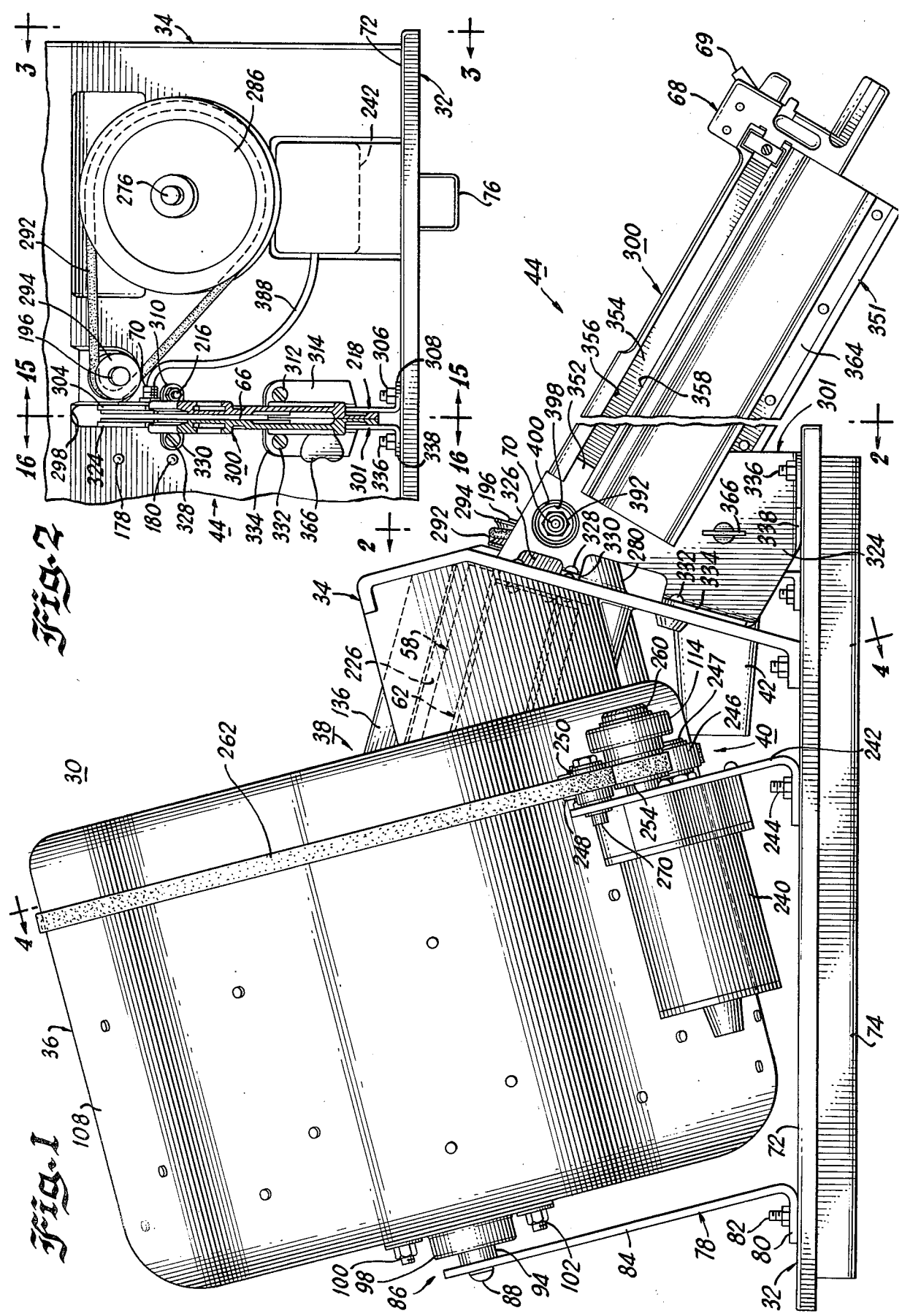

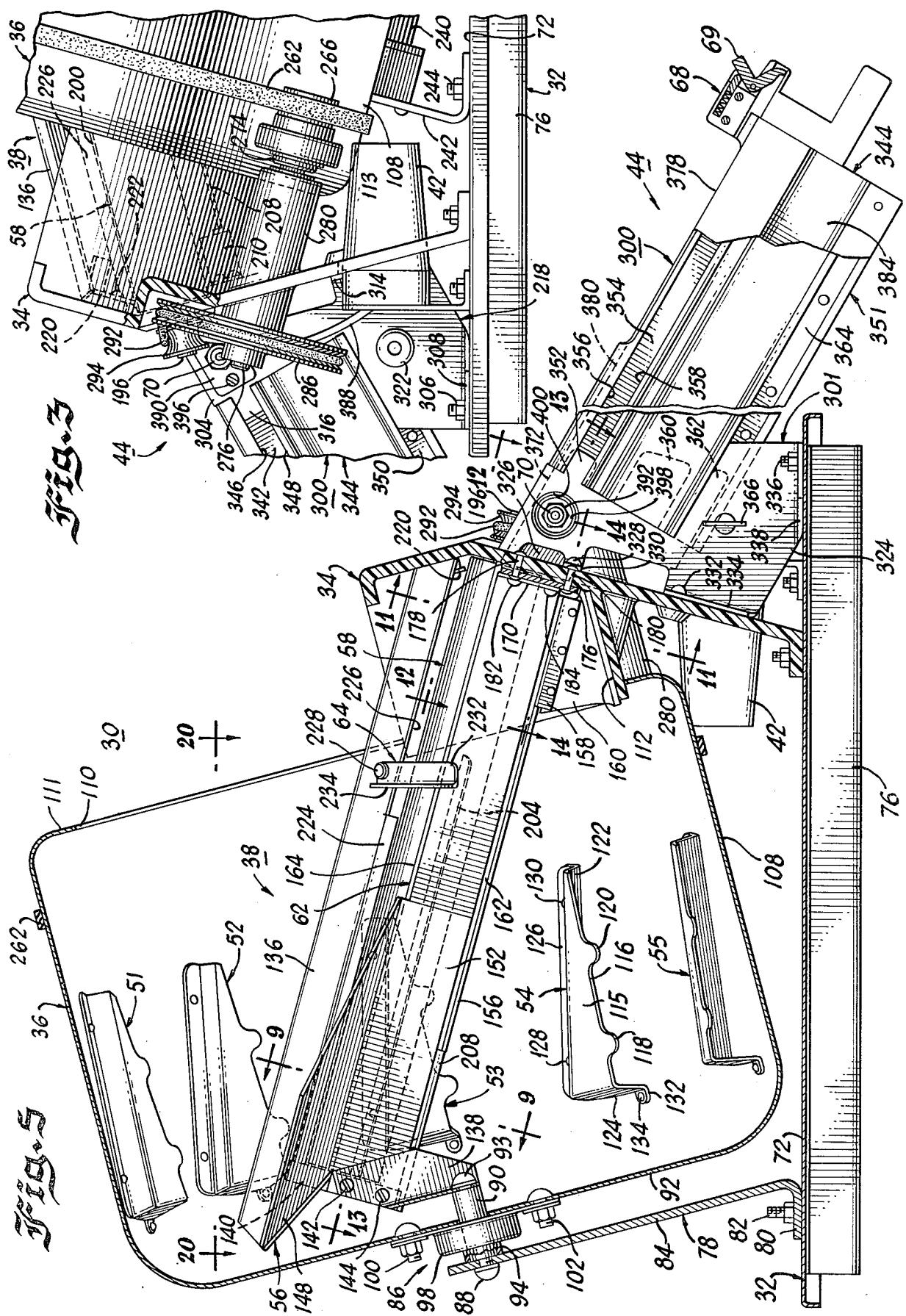

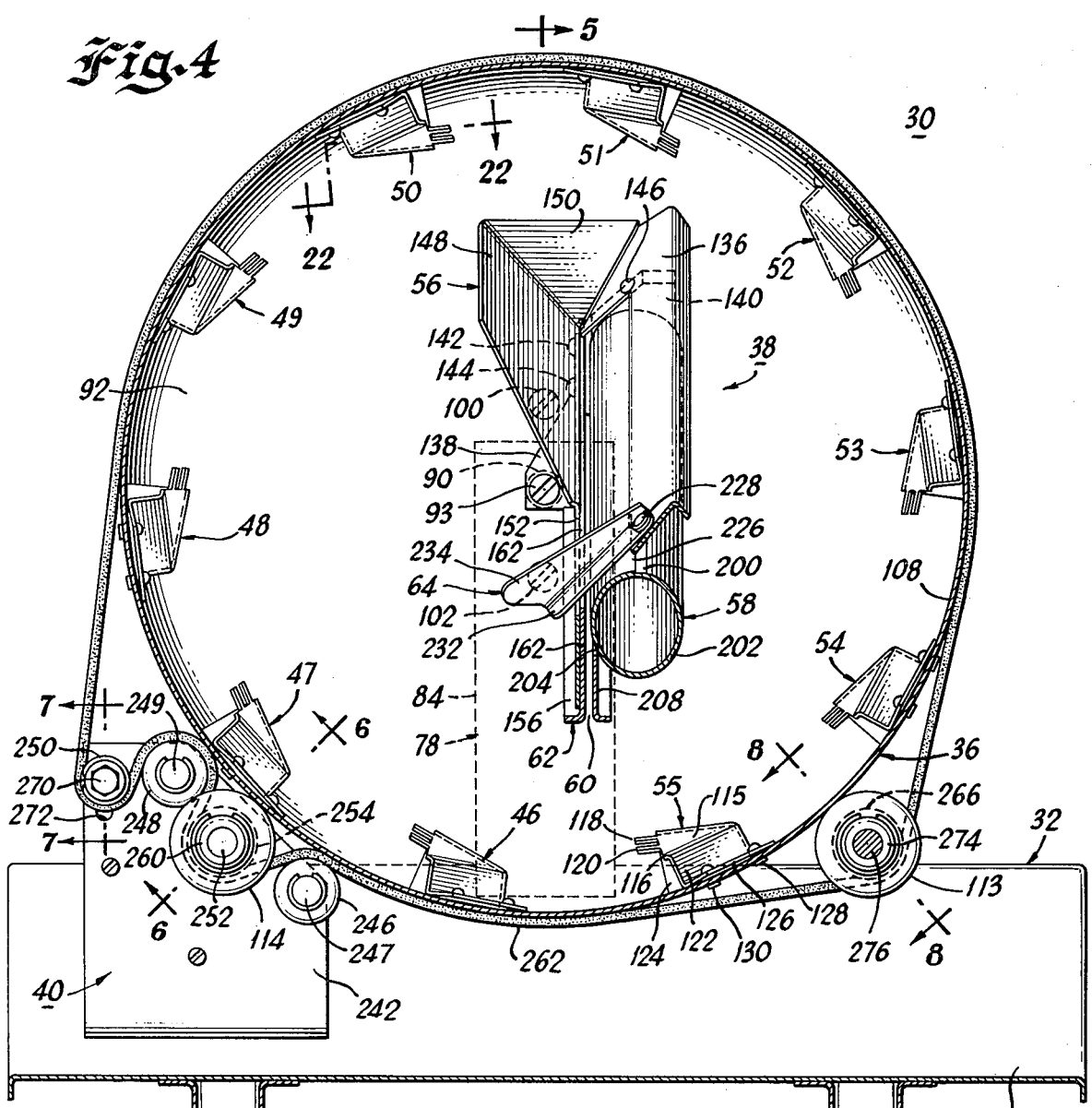
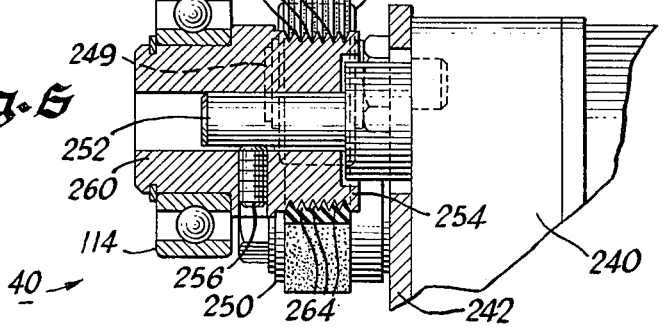

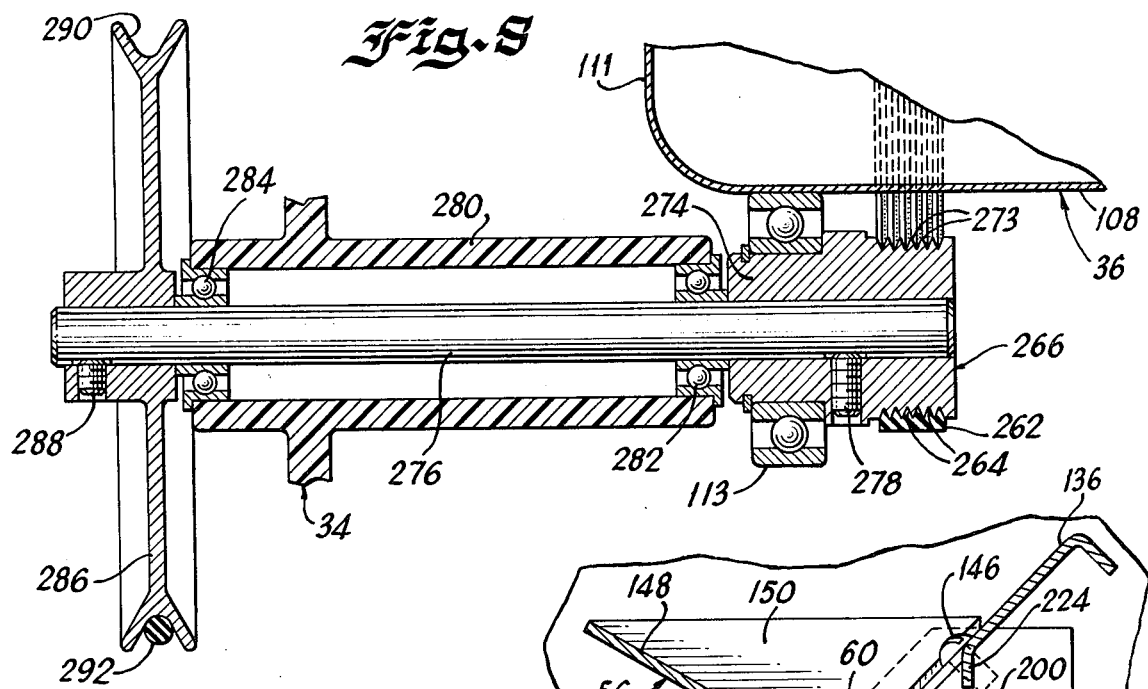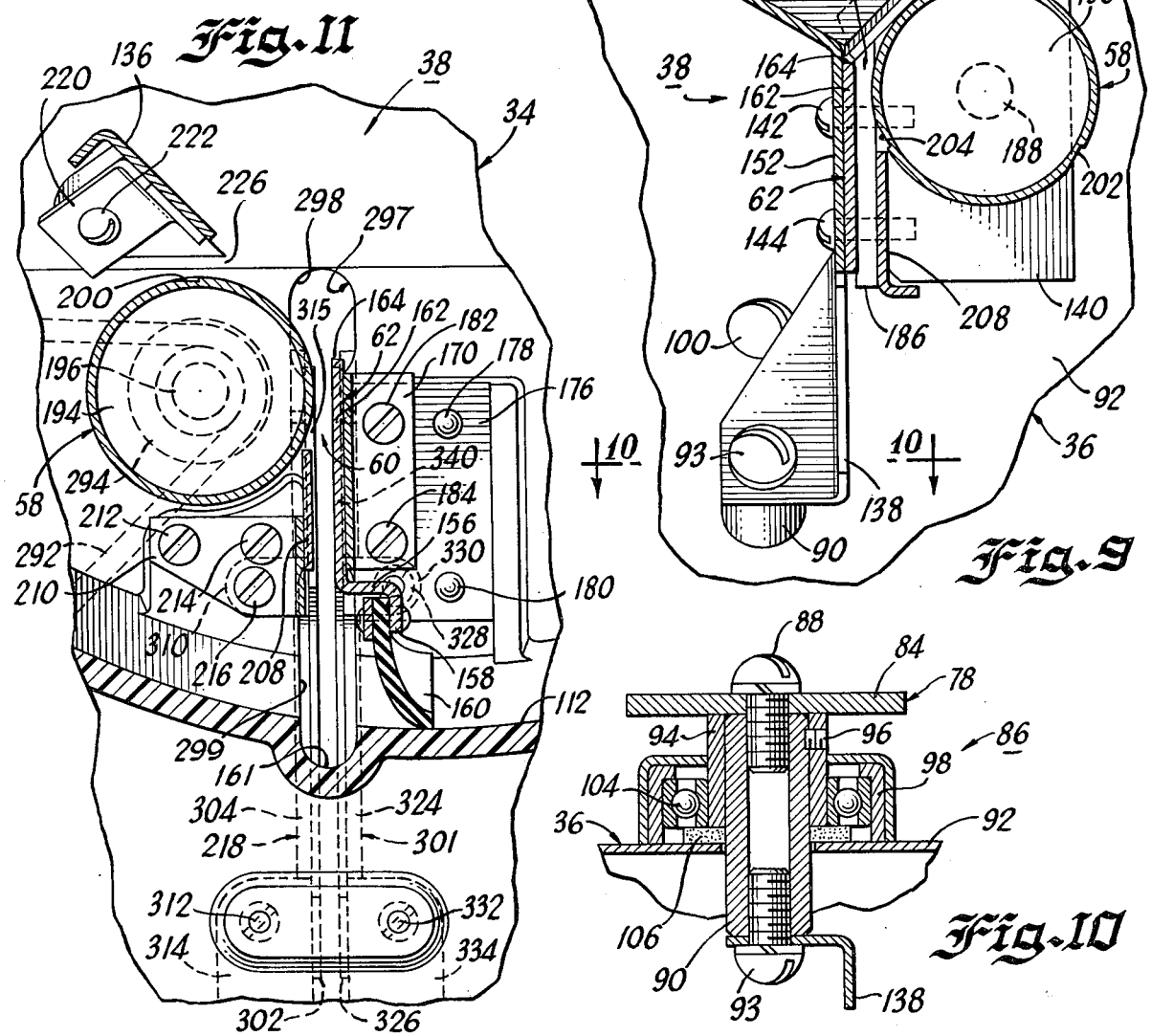

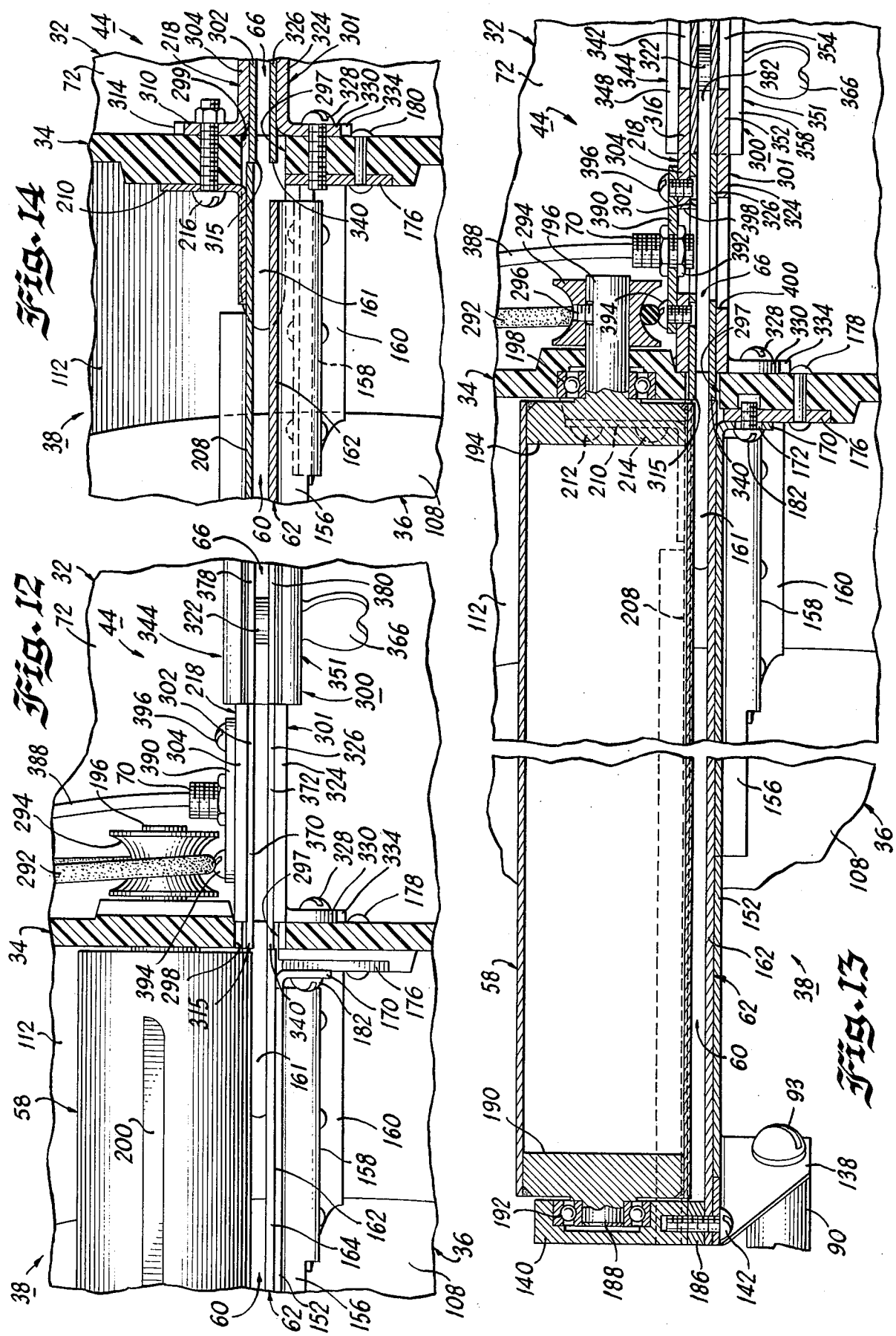

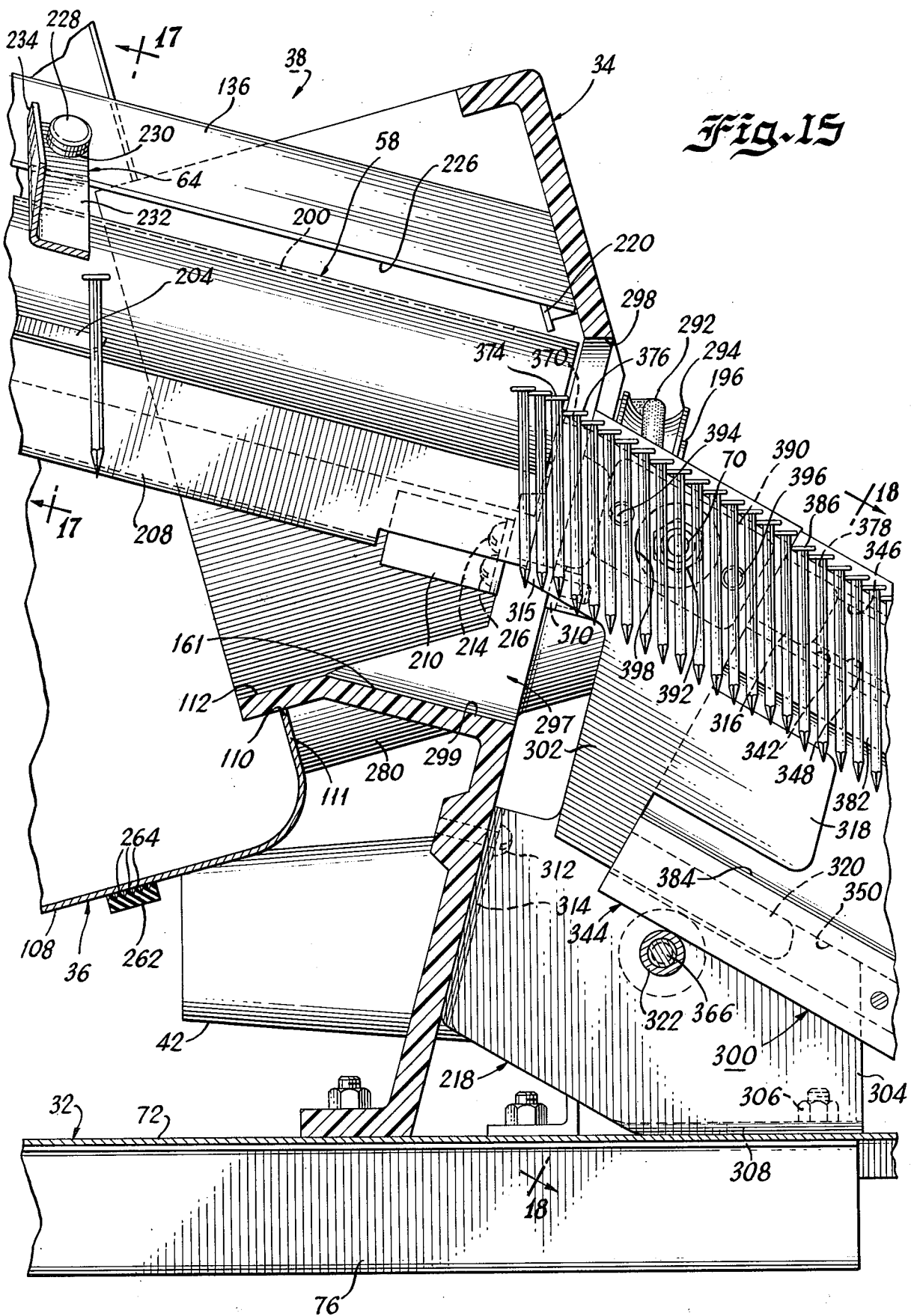

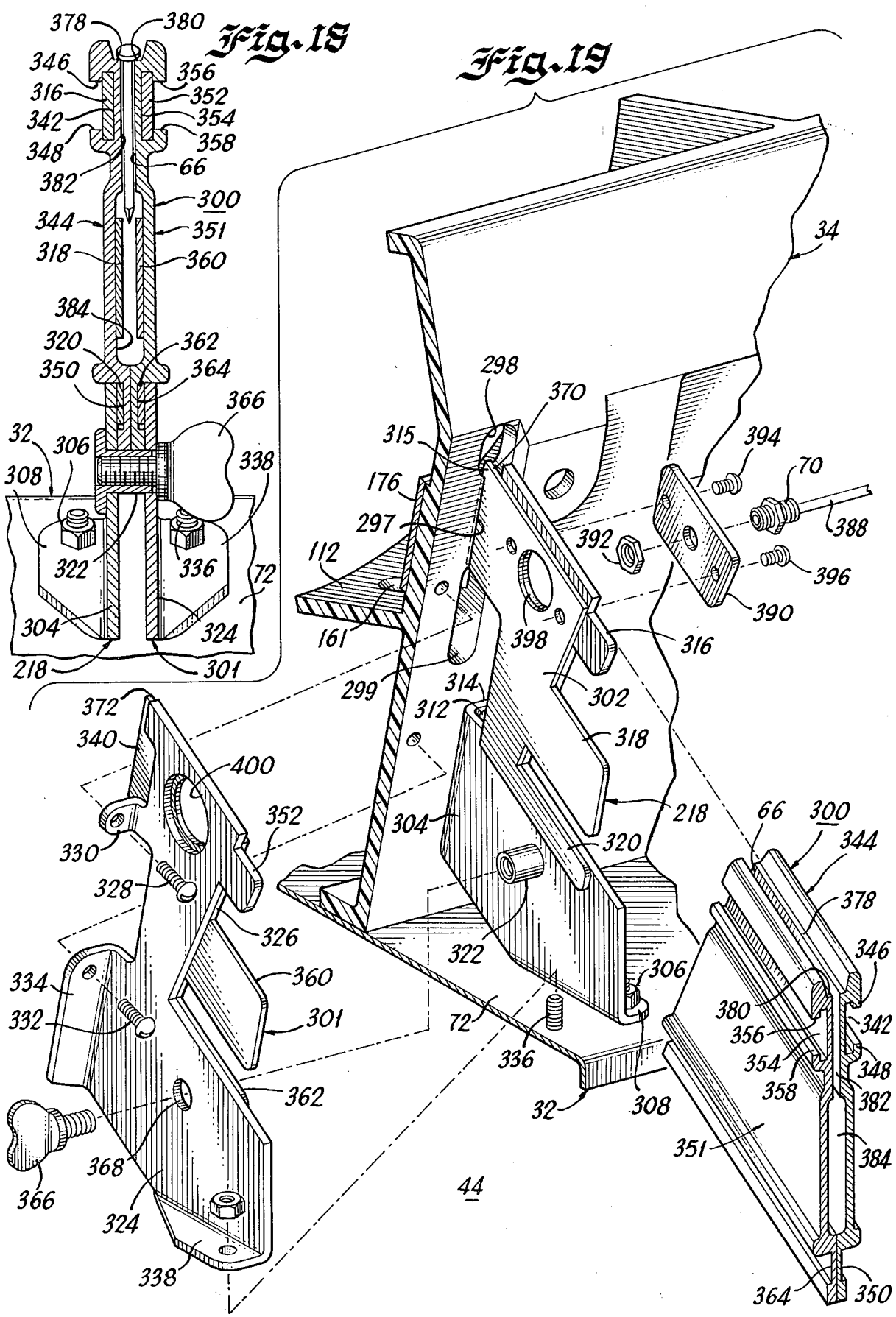

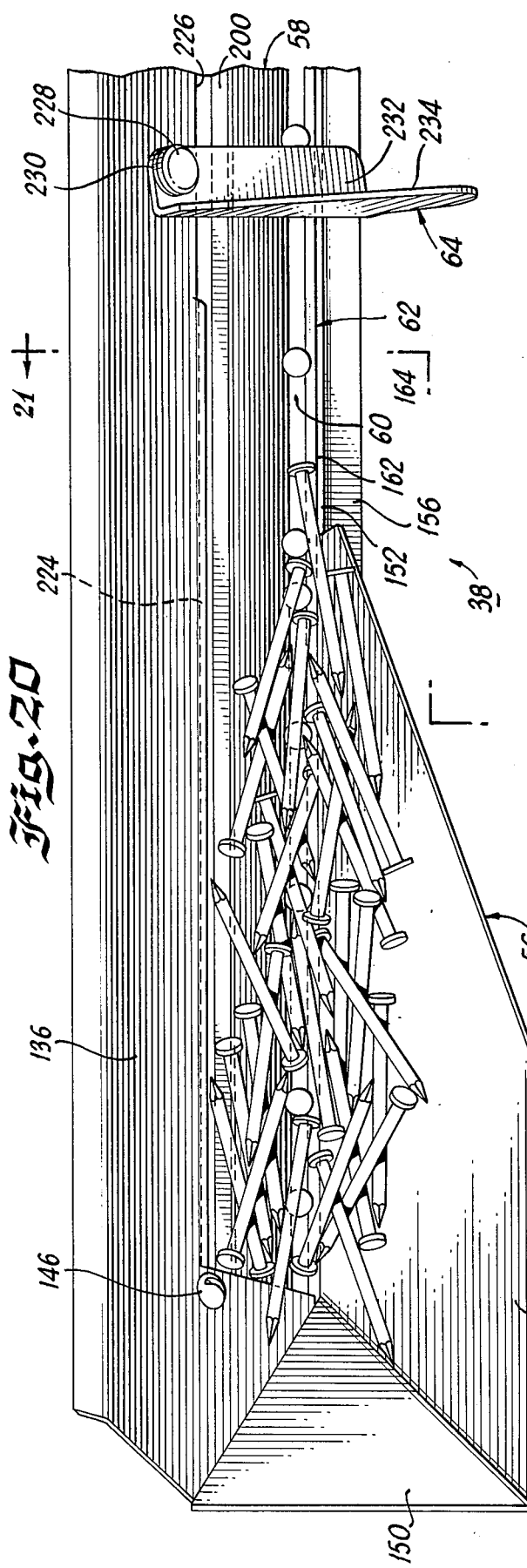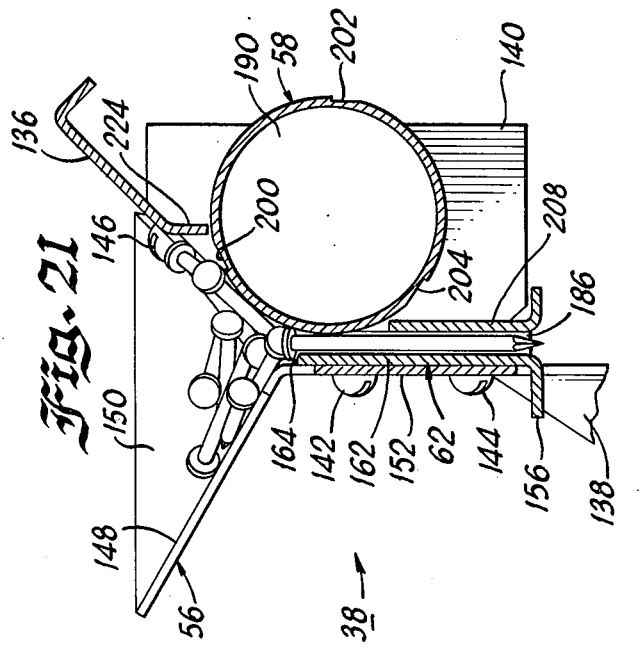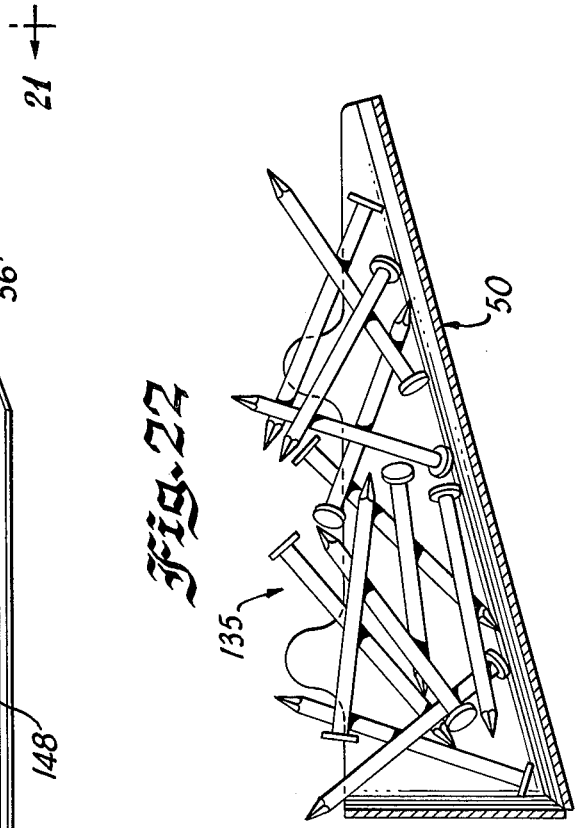

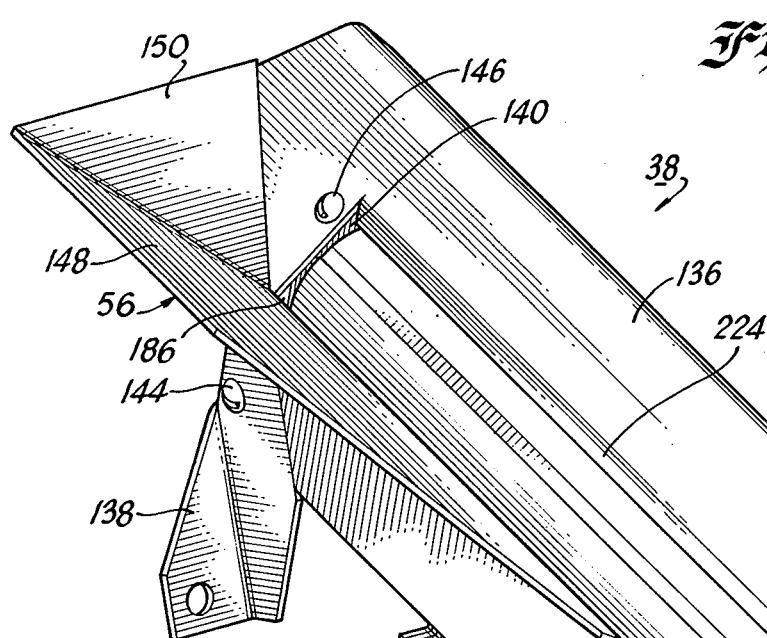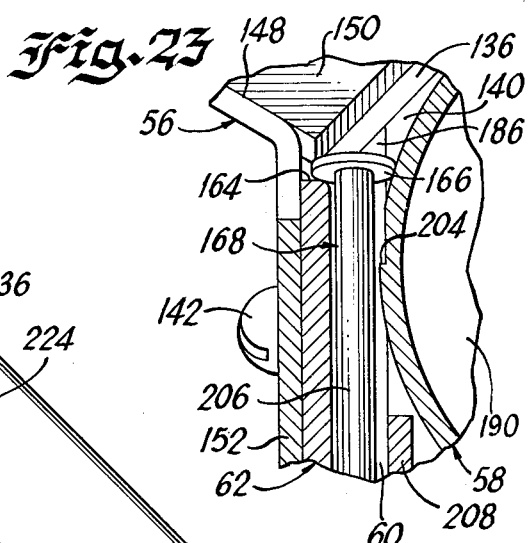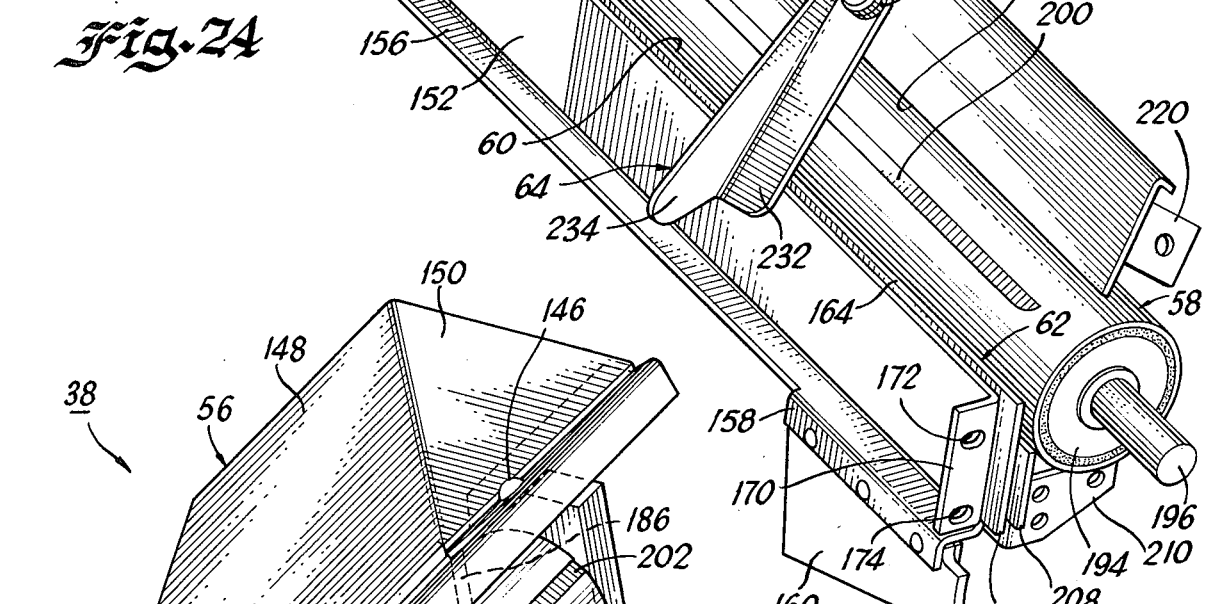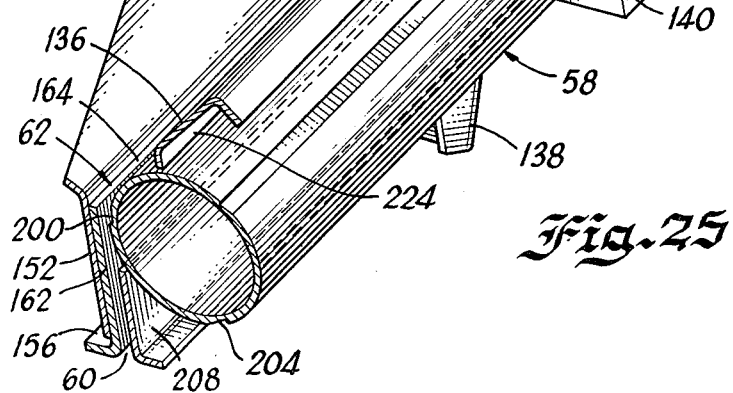

FASTENER FEEDER

The present invention relates to feeders for fasteners, and more particularly, to a new and improved feeder for supplying uniformly oriented, uncollated fasteners to a loading assembly so that the uncollated fasteners can be loaded into a magazine of a fastener driving tool.

Power operated nail driving tools of the type widely used in the past are supplied with nails in collated form. For example, such tool may utilize strips or sticks of similarly orientated nails held in collation by lengths of formed plastic, wire or other materials surrounding or secured to the nails. In another type of fastener collation, nails or other fasteners are frictionally held by a plastic carrier capable of being coiled. Although tools for driving collated fasteners have achieved very wide acceptance, the necessity for manufacturing strips or coils of fasteners is reflected in the cost of using such tools. Consequently, in certain applications tools capable of driving uncollated fasteners have become desirable. The term "uncollated" is used here to denote fasteners which may be uniformly oriented, but which are not held in a collated form by strips or carriers or materials other than the feeder or fastener driving tool itself.

One fastener driving tool designed to drive uncollated nails is disclosed in the copending U.S. patent application Ser. No. 256,409, which application is assigned to the assignee of record of the present application. Such tools for driving uncollated fasteners must be supplied with a quantity of uncollated fasteners which must be arranged in a uniformly oriented fashion. Attempts have been made in the past to provide feeders capable of supplying objects including nails in an aligned or ordered fashion from a supply of objects in a bulk or loose condition. However, since such feeders need to be capable of being used at job sights where the fastener driving tools are utilized, such feeders have been subject to various disadvantages, including a considerable and objectionable level of noise when the feeder is operated, the cost of the drive system and the support for such feeders and the complexity of the mechanism used to orient the fasteners in a uniform fashion.

Accordingly, objects of the present invention are to provide a new and improved feeder for supplying uncollated fasteners for a fastener driving tool; to provide a new and improved feeder for supplying fasteners, such as nails, in a uniformly aligned fashion to a loading assembly so that such fasteners can be supplied to a magazine of a fastener driving tool; to provide a new and improved feeder supplying uniformly oriented uncollated fasteners from a supply of bulk or loose fasteners so that the fasteners can be used in a fastener driving tool; to provide a new and improved feeder which utilizes a single motor to rotate a supply drum and an orientation roller mounted relative to the supply drum; to provide a new and improved feeder having a supply drum and an orientation roller rotating at different speeds by means of a pulley and belt system driven by a single motor; to provide a new and improved feeder that utilizes a single orientation roller extending into a supply drum to align the fasteners; to provide a new and improved feeder having a plurality of buckets or scoops on the inner wall of a supply drum which are designed to partially orient the fasteners and to supply a desired quantity of fasteners to an orientation assembly; to provide a new and improved feeder which is operated at a relatively slow speed so as to reduce noise and to avoid wear on any coatings on the fasteners; to provide a new and improved feeder having an orientation assembly to align fasteners in a fastener path by means of a orientation roller located on one side of the fastener path and a funnel shaped trough directing the fasteners toward the fastener path on the other side of the fastener path; to provide a new and improved feeder having a supply drum mounted in an inclined manner and for rotational movement relative to a base assembly by means of a mounting bracket at one end of the drum and idler rollers at the other end of the drum; to provide a new and improved feeder supplying uncollated fasteners along a fastener path that is inclined relative to a base assembly such that the fasteners tend to travel along the fastener path partially under the influence of gravity; to provide a new and improved feeder having a loading assembly detachably mounted to the feeder so that oriented fasteners can be loaded in a magazine of a fastener driving tool; to provide a new and improved feeder with a photo-optical sensor to control the operation of the feeder; and to provide a new and improved feeder for supplying uncollated fasteners for a fastener driving tool which overcomes disadvantages encountered with feeders for this purpose developed in the past.

In accordance with these and many other objects, an embodiment of the present invention comprises a feeder for supplying uncollated fasteners, each of which has a head and a shank, in a uniformly oriented fashion to a loading assembly which can be coupled to a magazine of a fastener driving tool. The feeder includes a rotatable supply drum disposed relative to a base and has a substantially open front end, a closed rear end and a plurality of scoop like shovels or scoops having finger type projections along the inner wall of the drum adjacent the rear end. The rear end of the supply drum is rotatably secured to a mounting bracket disposed on the base by a self-aligning bearing and the supply drum rests on a pair of idler rollers near its front end. As a result, the central elongated axis of the supply drum is inclined toward the front end at an angle of approximately 15° relative to the base.

As the drum is rotated, the scoops scoop a quantity of fasteners from a supply of bulk or loose fasteners disposed in the drum. When the scoops reach the pinnacle of their rotation, the fasteners in the scoop fall toward an orientation or aligning assembly extending into the front open end of the supply drum. The orientation assembly is designed to receive the unoriented fasteners from the scoops and align the fasteners along a fastener path. A funnel-shaped trough is disposed on one side of the fastener path so as to direct fasteners received from the scoops toward a rotatable orientation roller disposed on the other side of the fastener path. The orientation roller has several notches or grooves extending along various portions of its length. The notches tend to agitate or jiggle the fasteners as they are falling toward the fastener path and are moving along the fastener path. The fastener path is defined by the orientation roller on one side and a rail on the other side. The width of the fastener path is large enough to permit the shanks of the fasteners to fall into the path but small enough that the heads of the fasteners are held between the orientation roller and the rail. The fasteners tend to travel along the fastener path toward the open end of the supply drum because the orientation assembly is inclined at approximately a 15° angle from the base with its front portion lower than its rear portion. A fastener rejector is positioned along the fastener path so as to push back into the supply drum any fasteners that are not properly oriented in the fastener path.

A single motor mounted on the base rotates both the drum and the orientation roller. This is accomplished by having a primary drive belt looped about the outer perimeter of the drum such that as the drive belt is driven by the motor, the drum is rotated. Moreover, an auxiliary drive belt system driven by the primary drive belt rotates the orientation roller. The orientation roller is normally rotated at a greater speed than the supply drum is rotated.

Once the fasteners have been aligned within the fastener path, the fasteners travel toward a loading assembly which is detachably mounted at the front open end of the supply drum and has a fastener or loading path aligned with the fastener path of the orientation assembly. A photosensor is located in the loading assembly and detects when the loading path is full of fasteners. When the loading assembly is full, the motor is turned off such that no further fasteners are supplied to the loading assembly.

Many other objects and advantages of the present invention will become apparent from considering the following detailed description in conjunction with the drawings in which:

FIG. 1 is a side view of a fastener feeder embodying the present invention;

FIG. 2 is a partial front view, partially in section, of the fastener feeder of FIG. 1 taken along line 2—2 of FIG. 1;

FIG. 3 is a partial side view of the fastener feeder of FIG. 2 taken along line 3—3 of FIG. 2;

FIG. 4 is a sectional view taken along line 4—4 of FIG. 1;

FIG. 5 is a sectional view taken along line 5—5 of FIG. 4;

FIG. 6 is a partial sectional view taken along line 6—6 of FIG. 4;

FIG. 7 is a partial sectional view taken along line 7—7 of FIG. 4;

FIG. 8 is a partial sectional view taken along line 8—8 of FIG. 4;

FIG. 9 is a fragmentary sectional view on an enlarged scale taken along line 9—9 of FIG. 5;

FIG. 10 is a fragmentary sectional view taken along line 10—10 of FIG. 9;

FIG. 11 is a fragmentary sectional view on an enlarged scale taken along line 11—11 of FIG. 5;

FIG. 12 is a fragmentary sectional view taken along line 12—12 of FIG. 5;

FIG. 13 is a fragmentary sectional view taken along line 13—13 of FIG. 5;

FIG. 14 is a fragmentary sectional view taken along line 14—14 of FIG. 5;

FIG. 15 is an enlarged partial sectional view taken along line 15—15 of FIG. 2;

FIG. 18 is a fragmentary view showing the loading path of the loading assembly taken along line 18—18 of FIG. 15;

FIG. 19 is an exploded perspective view showing the attachment of the loading assembly to the front of the housing of the feeder of FIG. 1;

FIG. 20 is a top view of the feeder of FIG. 5 taken along line 20—20 of FIG. 5 illustrating a plurality of nails being received by and oriented by the orientation assembly;

FIG. 21 is a sectional view taken along line 21—21 of FIG. 20 to further illustrate nails being received by and oriented by the orientation assembly;

FIG. 22 is a partial sectional view taken along line 22—22 of FIG. 4 illustrating a cluster of nails within an individual scoop;

FIG. 23 is an enlarged fragmentary view of a portion of FIG. 21 illustrating a nail within the fastener path;

FIG. 24 is a perspective view of the orientation assembly of the feeder of FIG. 1; and FIG. 25 is a partial perspective view of a portion of the orientation assembly shown in FIG. 24.

Figure 16:
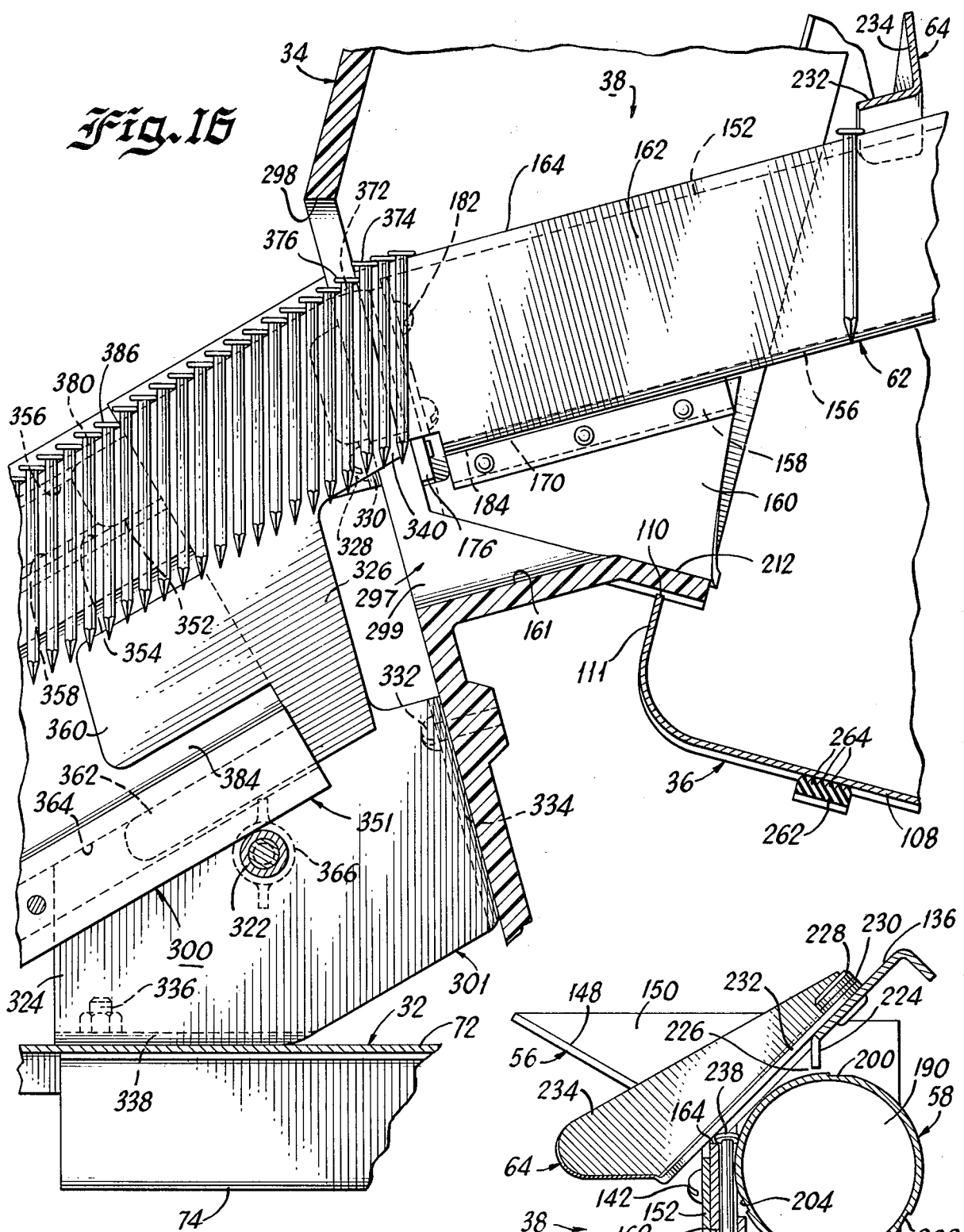
FIG. 16 is an enlarged partial sectional view taken along line 16—16 of FIG. 2.
Figure 17:
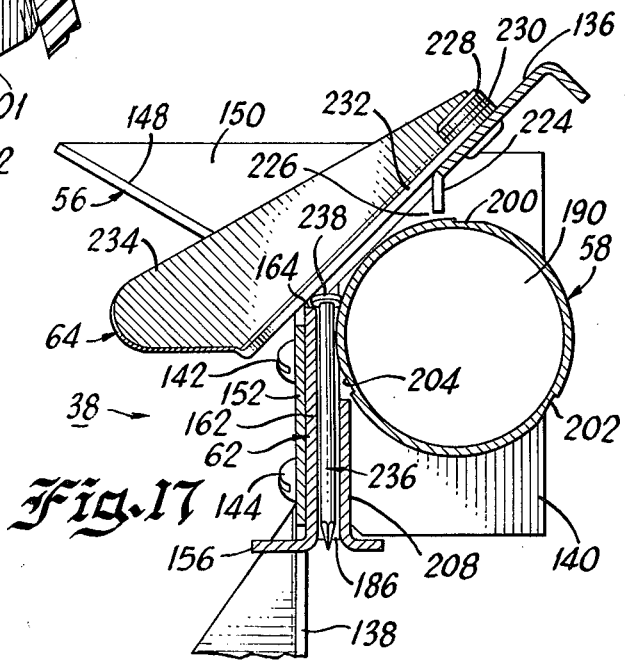
FIG. 17 is a front sectional view showing a part of the fastener path taken along line 17—17 of FIG. 15.

Referring now more specifically to FIGS. 1-5 of the drawings, therein is disclosed a feeder for a supplying uncollated fasteners in an oriented fashion so as to be used in a fastener driving tool, which feeder is generally designated by the numeral 30 and which embodies the present invention. The feeder 30 includes a base assembly 32 supporting a housing 34, a supply drum 36, an orientation assembly 38, a drive system 40, a photoelectric control 42, and a loading assembly 44. The drum 36 is rotated by the drive system 40 so that scoops or shovels 46-55 located on the inner wall of the drum 36 scoop or shovel a quantity of fasteners, such as nails (not shown in FIGS. 1-14), placed in the drum 36. As a particular scoop, such as the scoop 50, reaches the pinnacle of its rotation within the drum 36, the fasteners which it has scooped up fall from the scoop 50 toward the orientation assembly 38 and more particularly a trough 56. The fasteners slide along the trough 56 toward an orientation roller 58 forming another part of the orientation assembly 38. The orientation roller 58 is rotated such that the shank portions of the fasteners fall into a fastener path 60 formed between the orientation roller 58 and an orientation rail or guide 62. The fasteners tend to slide along this fastener path 60 under the influence of the rotating orientation roller 58 and the influence of gravity. Any fasteners not properly oriented within the fastener path 60 are rejected by a rejector 64 and fall into the supply drum 36 to be once again picked up by one of the scoops 46-55.

The loading assembly 44 is attached to the housing 34 and is positioned at the front end of the orientation assembly 38 so that a loading path 66 is in alignment with the fastener path 60. Once oriented in the fastener path 60, the fasteners slide along the path 60 into the loading path 66 toward a coupler 68 at the end of the loading assembly 44. The coupler 68 is more specifically described in copending U.S. patent application Ser. No. 256,491, now U.S. Pat. No. 4,389,012, which application is assigned to the assignee of record of the present application. A stop projection 69 at the end of the loading assembly 44 projects into the loading path 66 and stops the fasteners from proceeding past the coupler 68 until the coupler 68 is mated with a corresponding coupler (not shown) of a fastener driving tool. As the fasteners slide along the loading path 66, the fasteners pass a photosensor 70 coupled to the photoelectric control 42. As long as a fastener is not in front of the photosensor 70 for a specified time period, the photoelectric control 42 maintains the drive system 40 energized so that the drum 36 is continuously rotated and fasteners are fed along the fastener path 60 to the loading path 66. When the loading path 66 is full of fasteners, as is illustrated in FIGS. 15 and 16, fasteners no longer move past the photosensor 70 and the photoelectric control 42 deenergizes the driving system 40. In this manner, the feeder 30 automatically turns itself off when a sufficient amount of fasteners have been supplied to the loading assembly 44. If a quantity of fasteners are removed from the loading assembly 44 (for example, when the coupler 68 is mated with a coupler assembly of a fastener driving tool), a fastener is not in front of the photosensor 70 for the specified time period and the drive system 40 is again energized.

The base assembly 32 includes a support surface 72 from which extends a pair of legs 74 and 76. The legs 74 and 76 are designed so that the feeder 30 may be positioned on any appropriate work surface, such as a table, workbench or the like. A drum mounting bracket 78 is secured at a lower end or leg 80 by an appropriate fastener 82 to the support surface 72 of the base assembly 32. The drum mounting bracket 78 has an upstanding leg portion 84 extending from the lower end 80. A drum pivoting bracket 86 is secured to the leg portion 84 of the drum mounting bracket 78 by a fastener 88. The drum pivoting bracket 86 includes an inner shaft 90 which is secured to the leg 84 by the fastener 88 and extends through a rear wall 92 of the drum 36. The orientation assembly 38 is secured to the shaft 90 by a fastener 93, as is described in more detail hereinafter. A bearing block 94 is fixed to the shaft 90 by a set screw 96. A self-aligning bearing mechanism 98 is secured to the rear wall 92 of the drum 36 by fasteners 100 and 102 so that bearings 104 rotate about the bearing block 94 as the drum 36 is rotated. A seal 106 seals the opening in the rear wall 92 of the drum 36 through which the shaft 90 extends so that dust or other contaminants do not affect the operation of the bearing mechanism 98.

The drum 36 is generally cylindrical in shape and has a cylindrical wall 108 extending between the closed rear wall 92 and an opening 110 in the front end of the drum 36. A lip 111 extends about the opening 110 to partially close off a small portion of the opening 110 and fits against or is sealed by a curved projection 112 of the housing 34 so that fasteners will not fall below the drum 36 as they are deposited through the opening 110. The drum 36 is supported adjacent the front opening 110 by idlers 113 and 114. The drum 36 consequently is supported at three points by the drum pivoting bracket 86 and the idlers 113 and 114 such that the central axis of the drum 36 is inclined in an upward direction as it extends from left to right in FIGS. 1 and 5. The angle of incline, i.e., the angle at which the central axis of the drum 36 intersects the base support surface 72, is approximately 15°. The inclined mounting of the drum 36 in this manner causes any uncollated fasteners inserted through the opening 110 to tend to fall toward the rear wall 92 of the drum 36 and be scooped up or shoveled by the shovels 46–55.

The shovels 46–55 are attached in the inner cavity of the drum 36 along the inner part of the outer peripheral wall 108 of the drum 36. As illustrated in connection with the shovel 54, each of the shovels or scoops 46–55 have a scooping wall 115 having a leading edge 116 from which projects a pair of fingers 118 and 120. The scooping wall 115 is maintained in position spaced apart from the cylindrical wall 108 of the drum 36 by a support wall 122 and an end support wall 124. The support wall 122 is affixed to the cylindrical wall 108 by a flange 126 secured to the cylindrical wall 108 by rivets 128 and 130 or other appropriate fasteners. The end wall 124 has a leg 132 which is riveted to the cylindrical wall 108 by a rivet 134. The scooping wall 115 is generally triangularly shaped with the apex of the triangle directed toward the opening 110 in the front of the drum 36. As a result, the shovel 54 formed by the walls 115, 122 and 124 has a larger capacity near the rear wall 92 than adjacent the opening 110 at the front of the drum 36. The fingers 118 and 120 not only provide a means for facilitating the scooping up of a portion of the fasteners deposited in the drum 36 as the drum 36 is rotated, but also the size and shape of the fingers 118 and 120 along with the size of the shovel 54 tend to restrict to a desired amount the quantity of fasteners picked up by the individual scoops 46–55. In this manner, the orientation assembly 38 is not provided with too many fasteners as the feeder 30 is operated.

Once the fasteners are picked up near the bottom of the drum 36 by the scoops 46–55, the fasteners ride within the the individual scoops 46–55 as the drum is rotated in a clockwise direction as viewed through its front opening 110 in FIG. 4 of the drawings. A cluster of fasteners or nails 135 as they might be scooped up by one of the scoops 46–55 is illustrated in FIG. 22 in connection with the scoop 50. When a scoop reaches the position that scoop 50 is in FIG. 4 of the drawing, i.e., when an individual scoop reaches approximately the pinnacle of its rotation within the drum 36, the fasteners tend to fall from the scoops 46–55 toward the orientation assembly 38 and specifically the trough 56. The orientation assembly 38 then can align or orient the fasteners within the fastener path 60. FIGS. 20 and 21 illustrate a group of fasteners being received by the trough 56 of the orientation assembly 38 and being oriented within the fastener path 60. In order for the orientation assembly 38 to so align the fasteners, it is mounted within the drum 36 and through the opening 110 in the front of the drum 36 by the drum pivoting bracket 86 near the rear wall 92 of the drum 36 and by the housing 34. More specifically, the orientation assembly 38 has a support rail 136 extending along the top of the orientation roller 58. The support rail 136 has a supporting bracket 138 extending along the rear of the orientation assembly 38 and is mounted to the shaft 90 of the drum pivoting bracket 86 by the fastener 93. The support bracket 138 also is attached to the trough 56 and to a bearing block 140 by fasteners 142 and 144. The support rail 136 is further secured to the bearing block 140 by a fastener 146.

The trough 56 has funnel shaped directing walls 148 and 150 and a lower depending support wall 152. The walls 148 and 150 together with the rear portion of the support rail 136 are designed to receive fasteners as they are released from the scoops 46–55 and direct the fasteners toward the orientation roller 58. The orientation rail 62 is secured to the wall 152 by spot welding or the like forms one side of the fastener path 60. The orientation rail 62 is generally L-shaped with a leg 156 extending away from and below the wall 152 of the trough 56. The leg 156 has a flange 158 extending generally at right angles from the leg 156 and a nail deflector 160 is secured to the flange 158. The nail deflector 160 is made of a pliable material, such as vinyl, and as best seen in FIGS. 5 and 11 of the drawings, lies against the projection 112 of the housing 34 to deflect back into the drum 36 any unoriented fasteners which might otherwise fall from the orientation assembly 38 near the housing 34 into an opening 161 in the projection 112. The other leg 162 of the orientation rail 62 extends along the wall 152 of the trough 56 and forms an upper ledge 164 on which a head of a fastener, such as a head 166 of a fastener 168 shown in FIG. 23 of the drawings, rests once the fastener 168 is lodged within the fastener path 60.

The front of the support wall 152 of the trough 56 has a angular flange 170 with a pair of slotted holes 172 and 174 therein. The flange 170 is designed to fit against a mounting plate 176 secured to the housing 34 by rivets 178 and 180. Fasteners 182 and 184 fit through the holes 172 and 174, respectively, into the mounting plate 176. Since the holes 172 and 174 are slotted, the support wall 152 and thereby the orientation rail 62 may be adjusted slightly away from or toward the orientation roller 58 so that the width of the fasteners path 60 near the front of the orientation assembly 38 may be varied slightly depending upon the size of the fastener, such as the fastener 168, being oriented by the feeder 30. In order to also adjust the width of the fastener path 60 near the rear of the orientation assembly 38, a spacer 186 is positioned between the orientation rail 62 and the bearing block 140. By using different sizes for the spacer 186, the rear portion of the fastener path 60 will also be adjusted to conform it to the size of the fastener path 60 near the front of the orientation assembly 38 as determined by the positioning of the flange 170 against the mounting plate 176.

The orientation roller 58 is a generally hollow cylindrically shaped roller having a shaft 188 extending from a plug 190 lodged in the rear end of the roller 58. The shaft 188 is rotatably mounted on a bearing mechanism 192 disposed in the bearing block 140. The front end of the roller 58 also has a plug 194 lodged therein. A front shaft 196 extends from the front plug 194 and is journalled within a bearing mechanism 198 disposed in the housing 34. Hence, the orientation roller 58 can be rotated about the shafts 188 and 196 because they are mounted within the bearing mechanisms 192 and 198, respectively.

The orientation roller 58 has three grooves 200, 202 and 204 extending along portions of its outer periphery. The groove 200 extends substantially along the entire length of the roller 58 (see, for instance, FIGS. 12 and 23). On the other hand, grooves 202 and 204 extend along only a portion of the length of the roller 58 (see, for instance, FIGS. 5 and 15 of the drawings). As best seen in FIGS. 9, 17, 21 and 23, each of the grooves 200, 202 and 204 are generally L-shaped such that as the roller 58 is rotated in a generally clockwise direction as viewed from the front of the drum 36 in FIG. 4 or 24, the grooves 200, 202 and 204 tend to agitate or jiggle the fasteners, such as the fastener 168 in FIG. 23, as they are being oriented by the orientation assembly 38. By having all three grooves 200, 202, and 204 extend along the roller 58 from the rear plug 190 to the area where the rejector 64 is located, the fasteners being directed toward the fastener path 60 by the trough 56 will be agitated the most as they are being oriented in the proper manner within the fastener path 60. Once the fasteners reach the rejector 64 any fasteners that are not properly positioned and oriented within the fastener path 60 are rejected by the rejector 64 so that the fasteners as they proceed along the fastener path 60 beyond the rejector 64 need less agitation. Hence, only the groove 200 extends along the roller 58 substantially beyond the rejector 64 and the grooves 202 and 204 extend only slightly in front of the rejector 64.

In order to provide some guidance for the shanks of the fastener, such as the shank 206 of the fastener 168 shown in FIG. 23, a guide 208 is positioned somewhat below the orientation roller 58 on the opposite side of the fastener path 60 from that of the orientation rail 62. As best seen in FIG. 25 of the drawings, the guide 208 is generally L-shaped for a distance along the orientation roller 58. Near the front end of the orientation assembly 38, a mounting bracket 210 is secured to the guide 208. Fasteners 212 and 214 secure the mounting bracket 210 to the housing 34 and a fastener 216 extends through the mounting bracket 210 and the housing 34 into a loading assembly bracket 218. The guide 208 is secured near the rear of the orientation roller 58 by the fasteners 142 and 144.

The support rail 136 is positioned above the orientation roller 58 and is secured to the bearing block 140 by the fastener 146. At the front end of the support rail 136, an attachment bracket 220 enables the support rail 136 to be affixed to the housing 34 by a fastener 222. By having the support rail 136 so positioned above the orientation roller 58, it assists the trough 56 in directing fasteners from the scoops 46-55 toward the orientation roller 58 and hence toward the fastener path 60. The support rail 136 is consequently tapered outwardly from the orientation roller 58 and has a lower extending leg 224 which is designed to fit closely about the orientation roller 58. The leg 224 ensures that any fasteners riding upwardly on the roller 58 are forced back down toward the fastener path 60. The leg 224 terminates at a location near the rejector 64 so that a recess 226 is formed between the support rail 136 and the orientation roller 58. The recess 226 allows fasteners that are not properly aligned within the fastener path 60 but are pushed upwardly by the roller 58 to fall back into the supply drum 36.

The support rail 136 also supports the rejector 64. The rejector 64 is attached to the support rail 136 by a rivet 228 but is allowed to pivot about the rivet 228 because a washer 230 is inserted between the rivet 228 and the rejector 64. The rejector 64 has a generally L-shaped configuration with one leg 232 hanging downwardly from the support rail 136 along the orientation roller 58 and beyond the support wall 152 of the trough 56. Another projecting leg 234 extends away from the leg 232 and further insures that fasteners not appropriately lodged in the fastener path 60 are rejected and directed back into the supply drum 36. As can be best seen in FIG. 17 of the drawings, fasteners, such as the fastener 236 in FIG. 17 of the drawings, which are properly positioned within the fastener path 60 so that a head 238 is laying against the ledge 164 of the rail 62 and the side of the roller 58, pass below the rejector 64 and are unaffected by the rejector 64. This is also shown in FIGS. 20 and 21 wherein fasteners are illustrated after they are oriented in the fastener path 60.

In order to have the shovels 46-55 scoop up a quantity of fasteners deposited in the drum 36, the drive system 40 must rotate the drum 36. Advantageously, the drive system 40 includes a single motor 240 mounted on the support surface 72 of the base assembly 32 by a motor mounting bracket 242 secured to the support surface 72 by a fastener 244. The motor mounting bracket 242 also supports a belt tensioner 246 rotatable on a shaft 247 secured to the bracket 242, a belt tensioner 248 rotatable on a shaft 249 secured to the bracket 242, and a belt slack take up mechanism 250. When the motor 240 is energized, for instance, by the turning on of the feeder 30 through a switch (not shown), the motor 240 rotates an output shaft 252. A belt pulley 254 is constrained to rotate with the shaft 252 because a set screw 256 secures the belt pulley 254 to the output shaft 252. The pulley 254 has a series of circumferentially extending ridges 258 and an extending portion 260. As best seen in FIG. 6 of the drawings, the idler 114 is mounted on the extending portion 260 of the pulley 254 and is free to rotate relative to the pulley 254. In this manner, the idler 114 supports a portion of the front end of the drum 36 and permits the drum 36 to rotate relative to the pulley 254.

A drive belt 262 is in driving contact with the pulley 254 and has a series of V-grooves 264 which are designed to mate with the ridges 258 on the pulley 254. The drive belt 264 is maintained in driving contact with the pulley 254 by the belt tensioners 246 and 248 and in driving contact with an auxiliary driving pulley 266 as a result of the belt 264 being maintained taut around the outer periphery of the drum 36 and specifically the outer wall 108 of the drum 36 by the take up mechanism 250. As best seen in FIGS. 4 and 7 of the drawings, the take up mechanism 250 also has ridges 268 which are designed to mate with the V-grooves 264 in the belt 262. The take up mechanism 250 is secured to the motor mounting bracket 242 by a fastener 270. The fastener 270 is inserted in the mechanism 250 through a slotted hole 272 so that the take up mechanism 250 may be properly positioned to take up any slack in the belt 262. Since the belt 262 is maintained in driving contact with both the drive pulley 254 and the drum 36, the drum 36 is maintained against the idlers 113 and 114 and is rotated whenever the motor 240 is energized.

Whenever the belt 262 is so driven, the auxiliary drive pulley 266 is also rotated. As best seen in FIG. 8, the pulley 266 has ridges 273 mating with the V-grooves 264 of the drive belt 262 and has an extending portion 274 on which is rotatably mounted the idler 113. Since the idler 113 can rotate relative to the pulley 266, the drum 36 which is supported by the idler 113 is permitted to rotate relative to the drive pulley 266. A shaft 276 is secured to the pulley 266 by a set screw 278 and is journalled within a tubular portion 280 of the housing 34 by bearings 282 and 284. The shaft 276 also extends through the central portion of a driven pulley 286. The pulley 286 is constrained to rotate with the shaft 276 because the shaft 276 is fixed relative to the pulley 286 by a set screw 288. Hence, whenever the belt 262 is being driven by the motor 240, the pulley 286 is being rotated.

The outer perimeter of the pulley 286 has a V-groove 290 which is adapted to receive a roller belt 292. The roller belt 292 is of the elastic type and is in driving contact with the pulley 286. The roller belt 292 extends about a roller pulley 294 which is affixed to the shaft 196 by a set screw 296. Hence, whenever the pulley 286 is rotated the belt 292 causes the rotation of the roller pulley 294 and the shaft 196. As the shaft 196 is rotated the orientation roller 58 is also rotated. The speed of rotation of the roller 58 is determined by the speed with which the drive belt 262 is driven and the relative diameters of the pulleys 266, 286 and 294. As it is quite apparent from FIG. 8 of the drawings, the pulley 286 is substantially larger in diameter than the pulley 266 so that the pulley 294 and thereby the orientation roller 58 is rotated at a higher speed than the pulley 266. Since the pulley 266 is rotated at the same speed as the drum 36, the orientation roller 58 is being rotated at a greater speed than the speed the drum 36 is being rotated. Consequently, a single motor 240 is used to not only rotate the drum 36 at a substantially slow rotational speed, but also to rotate the orientation roller 58 at a substantially greater speed. For example, the orientation roller 58 can be rotated as much as seventy times as fast as the drum 36 is rotated.

Once fasteners have been properly aligned within the fastener path 60 by the orientation assembly 38, the fasteners slide along the fastener path 60 toward the front housing 34 of the feeder 30. The housing 34 has an elongated opening 297 with enlarged end openings 298 and 299. The opening 299 projects into the opening 161 in the projection 112 of the housing 34 to accommodate longer fasteners. The opening 297 is in alignment with the fastener path 60 through which the aligned or oriented fasteners may pass. The loading assembly 44 is mounted in front of the housing 34 so that the loading path 66 in the loading assembly 44 is in alignment with the fastener path 60 such that the aligned fasteners can slide along the loading path 66 toward the stop lever 69 on the coupler 68.

More specifically, the loading assembly 44 includes an exit chute 300 detachably mounted to the base assembly 32 and the housing 34 by the loading assembly bracket 218 and a similar loading assembly bracket 301. The loading assembly bracket 218 includes body portions 302 and 304 which are secured together by welding or the like. The body portion 304 is secured to the support surface 72 by a fastener 306 attaching a leg 308 to the surface 72. The body portion 304 is also secured to the housing 34 by the fastener 216 securing a leg portion 310 to the housing 34 and a fastener 312 securing to the housing 34 a flange 314 extending from the body portion 304. When the bracket 218 is so disposed, the body portion 302 has an end 315 projecting into the opening 297 in the housing 34. The body portion 302 has a tongue 316 and the body portion 304 has projections 318 and 320 projecting away from the housing 34 which are used to secure the exit chute 300 to the bracket 218. A fastener receiving projection 322 also extends perpendicularly away from the body portion 304.

The mounting bracket 301 also has two body portions 324 and 326 secured together by welding or the like. The body portion 324 is secured to the housing 34 by a fastener 328 extending through a leg 330 and a fastener 332 extending through a flange portion 334 extending from the body portion 324. The body portion 324 is also secured to the support surface 72 by a fastener 336 extending through another flange 338. When the body portion 324 is so positioned on the support surface 72 and against the housing 34, and end 340 of the body portion 326 extends into the opening 297 in the housing 34 adjacent to the end portion 315 of the body portion 304 but spaced apart from it. As can be best seen in FIGS. 13 and 14 of the drawings, the end portion 315 is in general alignment with the guide 208 and the end portion 340 is in alignment with the orientation rail 62.

In order to connect or detachably mount the exit chute 300 to the loading assembly brackets 218 and 301, the tongue 316 is inserted into a groove 342 in one rail section 344 of the exit chute 300. The groove 342 has ribs 346 and 348 such that the tongue 316 and the groove 342 fit together in a tongue-and-groove relationship. The projection 318 is inserted against an inside wall of the rail section 344 and the projection 320 fits into a slot 350 at the lower end of the rail section 344. Another rail section 351 of the exit chute 300 is secured to the rail section 344 and is designed to receive a tongue 352 projecting from the body portion 324 in a groove 354 having ribs 356 and 358. The insertion of the tongue 352 in the groove 354 provides a tongue-and-groove relationship firmly holding the rail section 351 to the body portion 324. In addition, a projection 360 on the body portion 326 projects against the inner wall of the rail section 351 and a projection 362 fits into a slot 364 at the bottom of the rail section 351. Once the exit chute 300 is so positioned relative to the mounting brackets 218 and 301 a retaining fastener 366 is inserted through a hole 368 in the body portion 324 and is threadedly engaged in the fastener receiving projection 322 extending from the body portion 304. The tightening of the fastener 366 maintains the exit chute 300 in proper engagement with the loading assembly brackets 218 and 301 and the projection 322 maintains the brackets 218 and 301 properly spaced apart.

When the exit chute 301 is so mounted on the brackets 218 and 300, a head of a nail traveling along the fastener path 60 on the ledge 164 of the orientation rail 62 can move through the opening 297 in the front housing 34 and have its head rest upon a ledge 370 forming the top part of the end 315 and a ledge 372 forming the top part of the end 340. Since the brackets 218 and 301 are maintained spaced apart by the projection 322, the shank portions of such nails can pass between the body portions 302 and 326 which define a portion of the loading path 66. As can be best seen in FIGS. 15 and 16, the ledges 370 and 372 are slightly below the level of the ledge 164 of the orientation rail 62 such that a nail, such as a nail 374 in FIG. 15, is at a slightly lower level than a nail positioned on the ledge 164, such as a nail 376 in FIG. 15. The nails slide along the ledges 370 and 372 until they reach the exit chute 300. The rail sections 344 and 351 of the exit chute 300 have corresponding shelf portions 378 and 380 on which the heads of the fasteners rest as they slide along the loading path 66.

The rail sections 344 and 351 are maintained slightly spaced apart such that a space 382 between the top portion of the rail sections 344 and 351 permit the shanks of the fasteners to extend downwardly between the rail sections 344 and 351 into an opening 384 in which the projections 318 and 360 are disposed. However, the spacing between the rail sections 344 and 351 is small enough that the heads of the fasteners rest on the shelf portions 378 and 380. As can be specifically seen in FIGS. 15 and 16 of the drawings, the shelf portions 378 and 380 are slightly below the level of the ledges 370 and 372 such that as a fastener, such as fastener 386 in FIGS. 15 and 16, reach the exit chute 300 the fastener falls to a slightly lower level than the fasteners sliding along the ledges 370 and 372. Since the ledges 370 and 372 and the exit chute 300 are mounted in such a manner that the ledges 370 and 372 and the shelf portions 378 and 380 are in a declining angular relationship with respect to the support surface 72, the fasteners travel along the exit chute 300 with the heads of the fasteners on the shelf portions 378 and 380 until they reach the stop lever 69 in the coupler 68 at the end of the exit chute 300. The movement of the fasteners along the exit chute 300 and the functioning of the coupler 68 is more specifically described in the copending U.S. patent application Ser. No. 256,491, now U.S. Pat. No. 4,389,012, mentioned above.

As long as the drum 36 is being rotated, fasteners deposited in the drum 36 are supplied to the orientation assembly 38 and are oriented in an aligned fashion along the fastener path 60. As previously, indicated the fasteners travel along the fastener path 60 into the loading path 66. Once the loading path 66 is full of fasteners, for instance, as illustrated in connection with FIGS. 15 and 16 of the drawings, the rotation of the drum 36 must be halted. In order to accomplish this, the photoelectric control 42 is provided to sense through the photosensor 70 the fact that the loading path 66 is full of fasteners.

More specifically, the photoelectric control 42 is coupled to the photosensor 70 by an appropriate multi-line conductor 388. The photosensor 70 is mounted against the body portion 304 by a sensor mounting plate 390 to which the photosensor 70 is secured by a fastener 392. The mounting bracket 390 is then positioned against the side of the body portion 304 by screws 394 and 396 which extend through the body portion 340 and into the body portion 302 of the mounting bracket 218. When the photosensor 70 is so mounted by the sensor mounting plate 390, the photosensor 70 is in alignment with a hole 398 in the body portions 302 and 304 and a corresponding hole 400 in the body portions 324 and 326 of the loading assembly bracket 301. The photosensor 70 includes an appropriate light source, such as a light emitting diode, which projects a beam of light through the holes 398 and 400. As long as no fasteners are positioned between the loading assembly brackets 218 and 301, a optical detector in the photosensor 70 does not detect the reflection of a portion of the light being emitted by the photosensor 70. When fasteners are moving along the loading path 66 in the exit chute 300 toward the coupler 68, the light being emitted by the photosensor 70 is being reflected in an interrupted fashion to the photodetector in the photosensor 70. Whenever the photoelectric control 42 either does not receive from the photosensor 70 any indication that reflected light is being detected or whenever it receives an indication that light is being reflected on an interrupted basis but each detected reflection is less than a specified time period, for instance, 0.3–0.5 of a second, the photo-electric control 42 maintains the motor 40 energized and fasteners located in the drum 36 are supplied in an oriented fashion to the loading path 66. However, when the loading path 66 is full of fasteners the photosensor 70 receives a constant reflection of the light being emitted by the photosensor 70 and supplies a constant signal to the photocontrol 42. Upon receiving such a constant signal, the photoelectric control 42 interrupts the operation of the drive motor 40 so as to halt the rotation of the drum 36 and no further fasteners are supplied by the orientation assembly 38 to the loading assembly 44.

If fasteners are taken from the loading assembly 44, as for instance when the fasteners are loaded into a magazine of a fastener driving tool, fasteners again move past the photosensor 70. As long as a fastener is not positioned in the path of the light being emitted by the photosensor 70 for a sufficient time period, the photocontrol 42 will again energize the motor 40 and fasteners again will be supplied to the loading assembly 44.

While the invention has been described with reference to the details of the illustrated embodiment such details are not intended to limit the scope of the invention as defined in the following claims.

What is claimed and desired to be secured by Letters Patent of the United States is:

1. A feeder for orienting uncollated fasteners, each fastener having a head and shank, comprising:
   a base means, a drum means mounted for rotatable movement about its central axis and being adapted to receive a plurality of uncollated fasteners, rotating means associated with said drum means to rotate said drum means, scoop means disposed in said drum means and adapted to scoop a portion of said plurality of said fasteners in said drum means as said drum means is rotated, an inclined orienting assembly extending into said drum means, said orienting assembly including a rotatable orienting roller and an orienting rail defining a fastener path, trough means associated with said fastener path to direct fasteners from said scoop means toward said fastener path, said orienting roller having a plurality of straight longitudinally extending grooves, and mounting means mounting said orienting assembly in said drum means.

2. The feeder as set forth in claim 1 wherein said drum means has an inner cavity and an outer cylindrical wall, said drum means being mounted relative to said base means, and being adapted to receive a plurality of fasteners into said inner cavity, said rotating means includes drive means mounted on said base means, and a belt means driven by said drive means and in direct driving contact with said outer cylindrical wall of said drum means such that said drum means is rotated when said belt means is driven by said drive means, and including control means controlling the operation of said drive means.

3. The feeder as set forth in claim 2 wherein said drive means includes a motor having a rotatable output means, said belt means being in driving contact with said output means.

4. The feeder as set forth in claim 3 including tension means to maintain said belt means in driving contact with said output means and said belt drum means, said tension means having a first belt tensioner means adjacent one side of said output means, a second belt tensioner means adjacent another side of said output means and a belt take up means, said first and second tensioner means and said belt take up means cooperating to maintain said belt means taut and in driving contact with said drum means and said output means.

5. The feeder as set forth in claim 3 including a first idler means in contact with said drum means to support said drum means relative to said base means and to permit said drum means to rotate, said first idler means being associated with said output means.

6. The feeder as set forth in claim 5 including second idler means in contact with said drum means to support said drum means relative to said base means.

7. The feeder as set forth in claim 3 wherein said belt means includes a belt having belt grooves on one side, said belt grooves mating with corresponding ridges on said output means.

8. The feeder as set forth in claim 1 including an auxilliary driven means in driving contact with said belt means, and a roller belt means driven by said auxilliary driven means and driving said orienting roller.

9. The feeder as set forth in claim 8 wherein said auxilliary driven means includes a first pulley in contact with said belt means and driven by said belt means and a second pulley constrained to rotate with said first pulley, said second pulley being in driving contact with said belt means.

10. The feeder as set forth in claim 9 wherein said orienting roller has a roller pulley in driving contact with said roller belt means.

11. The feeder as set forth in claim 10 wherein said second pulley is of a different diameter than said first pulley such that said orienting roller is rotated at a different speed than said drum means.

12. The feeder as set forth in claim 11 wherein said second pulley is of a larger diameter than said first pulley such that said orienting roller is rotated at a faster speed than said drum means.

13. The feeder as set forth in claim 1 wherein said drum means is mounted on said base means and has one end substantially open and has an opposed end substantially closed, said drum means adapted to receive through the open end a plurality of said fasteners, said rotating means includes a drive means mounted on said base means, and including drum mounting bracket means disposed on said base means, said drum mounting bracket means having pivotal means mounting said drum means at the central portion of said closed end so as to permit said drum means to rotate, first and second idler means in contact with said drum means adjacent said open end, said first and second idler means supporting said drum means relative to said base means and permitting said drum means to rotate, and wherein said rotating means including a belt driven by said drive means and extending about the outer periphery of said drum means adjacent said open end, said belt maintaining said drum means against said first and second idler means, and further including control means controlling the operation of said drive means.

14. The feeder as set forth in claim 13 wherein said drum mounting bracket means and said first and second idler means maintain said drum means oriented such that the central axis of said drum means is inclined toward its open end at approximately a 15° angle.

15. The feeder as set forth in claim 13 wherein said pivotal means includes a self-aligning bearing supporting the closed end of the drum means on said drum mounting bracket means.

16. The feeder as set forth in claim 13 including belt tensioning means to maintain said belt in contact around the outer periphery of said drum means such that said drum means is maintained against said first and second idler means and is rotated as said belt is driven by said drive means.

17. The feeder as set forth in claim 16 wherein said belt has V-grooves therein and said drive means and said belt tensioning means have corresponding ridges to mate with said V-grooves of said belt.

18. The feeder as set forth in claim 13 wherein said drum means has a lip about its outer periphery at said open end.

19. The feeder as set forth in claim 1 wherein said drum means has a cylindrical wall extending between a substantially closed end and a substantially open end, wherein said rotating means includes drive means mounted on said base means to rotate said drum means, and wherein said scoop means includes a plurality of shovels in said drum means projecting into said drum means from the inner wall of said drum means, each of said shovels having a plurality of projection means to facilitate grasping a portion of said plurality of said fasteners as said drum means is rotated and a scooping edge spaced from said cylindrical wall and from which said plurality of projection means extend, said scooping edge extending in the direction of rotation of said drum means and being disposed along a scooping wall of each of said shovels, said scooping wall being wider near said closed end than near said open end of said drum means, and including control means controlling the operation of said drive means.

20. The feeder as set forth in claim 19 wherein said scooping wall is generally triangular in shape with the apex of said triangular shaped scooping wall closer to said open end of said drum means than said closed end.

21. The feeder as set forth in claim 19 wherein each of said plurality of said shovels includes a support wall and an end support wall projecting away from said cylindrical wall of said drum means so as to support said scooping wall spaced apart from said cylindrical wall of said drum means.

22. The feeder as set forth in claim 21 wherein said support wall is secured to said cylindrical wall of said drum means by a flange means extending along said support wall and said end support wall has a leg extending from it which secures the end support wall to said cylindrical wall of said drum means.

23. The feeder as set forth in claim 19 wherein said plurality of projection means extend from each of said plurality of shovels in the direction said drum means rotates.

24. The feeder as set forth in claim 19 wherein said plurality of projection means comprises a plurality of fingers extending from each of said plurality of shovels such that each of said shovels tends to scoop up a desired number of said plurality of said fasteners.

25. The feeder as set forth in claim 24 wherein each of said shovels has two round fingers.

26. The feeder as set forth in claim 1 wherein said orienting roller is rotated at a greater speed than said drum means is rotated.

27. The feeder as set forth in claim 1 wherein said plurality of grooves includes one groove extending substantially the entire length of said orienting roller and two other grooves extending a lesser portion of the length of said orienting roller.

28. The feeder as set forth in claim 27 including a fastener rejector associated with said fastener path to reject fasteners not properly oriented in said fastener path, said fastener rejector is pivotable mounted above said orienting roller and said orienting rail.

29. The feeder as set forth in claim 1 wherein said mounting means includes adjusting means to adjust the position of said orienting rail such that the distance between said orienting roller and said orienting rail is greater than the diameter of the shanks of said fasteners but less than the diameter of the heads of said fasteners.

30. The feeder as set forth in claim 1 wherein said trough means includes a funnel shaped fastener directing portion extending along a portion of the orienting roller to direct fasteners toward said orienting roller.

31. The feeder as set forth in claim 30 wherein said funnel shaped fastener directing portion is on an opposite side of said fastener path from said orienting roller.

32. The feeder as set forth in claim 1 wherein said fastener path is offset from said central axis of said drum means in a direction of rotation of said drum means.

33. The feeder as set forth in claim 1 including a shank guide means disposed along the lower portion of said orienting roller and spaced apart from said orienting rail to guide the shanks of said fasteners positioned within said fastener path.

34. The feeder as set forth in claim 1 including a support rail mounted over said orienting roller, said support rail having an opening extending along a portion of said orienting roller.

35. The feeder as set forth in claim 34 including a fastener rejector mounted on said support rail adjacent said opening.

36. The feeder as set forth in claim 1 wherein said drum means has a substantially open front end and said orienting rail has a leg portion extending away from said fastener path and including a flexible deflector attached to said leg portion adjacent said front end of said drum means to deflect fasteners not properly oriented in said fastener path into said drum means.

37. A feeder for orienting uncollated fasteners, each fastener having a head and shank, comprising:

a base means, a drum means mounted for rotatable movement about its central axis and being adapted to receive a plurality of uncollated fasteners, rotating means associated with said drum means to rotate said drum means, scoop means disposed in said drum means and adapted to scoop a portion of said plurality of said fasteners in said drum means as said drum means is rotated, an inclined orienting assembly extending into said drum means, said orienting assembly including a rotatable orienting roller an orienting rail defining a fastener path, and trough means associated with said fastener path to direct fasteners from said scoop means toward said fastener path, said orienting roller including grooves, said grooves being L-shaped so as to tend to elevate the heads of said fasteners as the fasteners are being positioned in said fastener path, and mounting means mounting said orienting assembly in said drum means.

38. A feeder for orienting uncollated fasteners, each fastener having a head and shank, comprising:

a base, a housing disposed on said base, a drum means mounted for rotatable movement about its central axis and being adapted to receive a plurality of uncollated fasteners, rotating means associated with said drum means to rotate said drum means, scoop means disposed in said drum means and adapted to scoop a portion of said plurality of said fasteners in said drum means as said drum means is rotated, an inclined orienting assembly extending into said drum means and secured to said housing, said orienting assembly having orienting means to orient fasteners received from said scoop means in a fastener path,
a loading assembly detachably mounted to said housing and on said base, said loading assembly having a loading path in alignment with said fastener path so as to receive oriented fasteners from said orienting assembly and having first alignment means,
mounting bracket means to mount said loading assembly to said housing and on said base, said mounting bracket means having second alignment means interfitting with said first alignment means to properly align said loading path with said fastener path, said second alignment means having a plurality of projecting means and first alignment means including a plurality of slots adapted to receive said projecting means so that said loading path is in proper alignment with said fastener path when said loading assembly is mounted on said base and to said housing by said mounting bracket means, and
coupler means to selectively maintain said fasteners in said loading assembly.

39. The feeder as set forth in claim 38 including sensor control means associated with said loading assembly to sense when said loading assembly has a sufficient quantity of fasteners in said loading path, said sensor control means deactivating said rotating means when said sensor control means senses said sufficient quantity of fasteners and including a photo-sensing device mounted relative to said loading path, said photo-sensor device detecting when a fastener in said loading path is in front of said photo-sensor device for a specified time period and deactivating said rotating means when said fastener is so detected.

40. The feeder as set forth in claim 39 wherein said photo-sensing device is mounted on said mounting bracket means.

41. The feeder as set forth in claim 39 wherein said photo-sensing device emits light energy and senses the reflection of said light energy when one of said fasteners is positioned or moving through the path of said light energy.

42. The feeder as set forth in claim 38 wherein said loading assembly extends downwardly from said base so that said fasteners slide downwardly along said loading path toward said coupler means.

43. A feeder for orienting uncollated fasteners, each fastener having a head and shank, comprising:
a base,
a housing disposed on said base,
a drum means mounted for rotatable movement about its central axis and being adapted to receive a plurality of uncollated fasteners,
rotating means associated with said drum means to rotate said drum means,
scoop means disposed in said drum means and adapted to scoop a portion of said plurality of said fasteners in said drum means as said drum means is rotated,
an inclined or orienting assembly extending into said drum means and secured to said housing, said orienting assembly having orienting means to orient fasteners received from said scoop means in a fastener path,
a loading assembly detachably mounted to said housing and on said base, said loading assembly having a loading path in alignment with said fastener path so as to receive oriented fasteners from said orienting assembly and having first alignment means, said loading assembly including an exit chute formed by first and second rail sections spaced apart so as to receive said fasteners therebetween, said first rail section having first slot means and said second rail section having second slot means and wherein said mounting bracket means includes first mounting bracket means having first projecting means to mate with said first slot means and second mounting bracket means having second projecting means to mate with said second slot means,
mounting bracket means to mount said loading assembly to said housing and on said base, said mounting bracket means having second alignment means interfitting with said first alignment means to properly align said loading path with said fastener path, and
coupler means to selectively maintain said fasteners in said loading assembly.

44. The feeder as set forth in claim 43 wherein said first and second rail sections form a shelf portion on which said heads of said fasteners rest and form a space therebetween through which said shanks of said fasteners extend.

* * * * *